(12) United States Patent
Kawai (10) Patent No.: US 7,827,277 B2
(45) Date of Patent: Nov. 2, 2010

(54) NETWORK SYSTEM INCLUDING DEVICE MANAGING APPARATUS THAT MANAGES NETWORK DEVICES THROUGH A NETWORK

(75) Inventor: Sunao Kawai, Toyoake (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 287 days.

(21) Appl. No.: 12/076,684

(22) Filed: Mar. 21, 2008

(65) Prior Publication Data
US 2008/0244043 A1 Oct. 2, 2008

(30) Foreign Application Priority Data
Mar. 30, 2007 (JP) .............................. 2007-091333

(51) Int. Cl.
*G06F 15/173* (2006.01)
(52) U.S. Cl. .................................................. 709/224
(58) Field of Classification Search ................. 709/224
See application file for complete search history.

(56) References Cited

U.S. PATENT DOCUMENTS

| 6,064,491 | A | 5/2000 | Matsumoto | |
|---|---|---|---|---|
| 6,184,996 | B1 | 2/2001 | Gase | |
| 6,480,304 | B1 | 11/2002 | Os | |
| 7,334,252 | B1* | 2/2008 | Millet et al. | 725/111 |
| 7,577,146 | B2* | 8/2009 | Arberg et al. | 370/392 |
| 2002/0010767 | A1* | 1/2002 | Farrow et al. | 709/223 |
| 2003/0037287 | A1 | 2/2003 | Nakamura et al. | |
| 2003/0229819 | A1* | 12/2003 | Kodama | 714/5 |
| 2004/0061905 | A1 | 4/2004 | Ohara | |
| 2004/0061907 | A1 | 4/2004 | Nakaota | |
| 2005/0174592 | A1 | 8/2005 | Iinuma et al. | |
| 2006/0126111 | A1 | 6/2006 | Song et al. | |
| 2006/0206628 | A1 | 9/2006 | Erez | |
| 2007/0061484 | A1* | 3/2007 | Droms et al. | 709/245 |
| 2007/0171456 | A1 | 7/2007 | Shimazaki | |
| 2008/0201617 | A1 | 8/2008 | Ohara et al. | |

FOREIGN PATENT DOCUMENTS

EP 1 168 174 A1 1/2002

(Continued)

OTHER PUBLICATIONS

U.S. Appl. No. 12/068,996, filed Feb. 14, 2008, Ohara et al.
European Search Report issued in European Patent Application No. EP 08 251 117.1, mailed Nov. 17, 2008.

(Continued)

*Primary Examiner*—George C Neurauter, Jr.
(74) *Attorney, Agent, or Firm*—Banner & Witcoff, Ltd.

(57) ABSTRACT

There is provided a network system including a server and a printer connected to a network, where the server collects and stores configuration data describing operating conditions from respective printers, the server stores the respective collected configuration data associated with a registered ID. If a user enters a predetermined registered ID in new printer, the new printer transmits the entered registered ID to the server. The server, upon receiving the entered registered ID, transmits configuration data associated with the entered registered ID to the new printer. The new printer sets the operating conditions described in the received configuration data to its own operating conditions.

5 Claims, 7 Drawing Sheets

FOREIGN PATENT DOCUMENTS

| | | |
|---|---|---|
| EP | 1 389 851 A1 | 2/2004 |
| JP | 2000-82040 | 3/2000 |
| JP | 2001-156926 | 6/2001 |
| JP | 2002-373064 A | 12/2002 |
| JP | 2005-242781 A | 9/2005 |
| JP | 2006-134198 | 5/2006 |

OTHER PUBLICATIONS

Extended EP Search Report dtd Apr. 29, 2009, EP Appln. 08250541.3.

US Office Action dtd Nov. 17, 2009, U.S. Appl. No. 12/068,996.

CN Office Action dtd Mar. 10, 2010, CN Appln. 200810090744.1, English Translation.

* cited by examiner

NETWORK SYSTEM INCLUDING DEVICE MANAGING APPARATUS THAT MANAGES NETWORK DEVICES THROUGH A NETWORK

CROSS-REFERENCE TO RELATED APPLICATION

This application claims priority to Japanese Patent Application No. 2007-91333, filed on Mar. 30, 2007, the contents of which are hereby incorporated by reference into the present application.

BACKGROUND OF THE INVENTION

1. Field of the Invention

The present invention relates to a technology for managing network devices through a network.

The network device as used herein implies a printer, a scanner, a facsimile, and a multi-function apparatus which integrates a printer, a scanner and a facsimile, for example, and is connected to a network.

2. Description of the Related Art

A system which manages the network devices through the network is known. Japanese Patent Application Publication No. 2002-236576 discloses a network system including Multi-Function Apparatuses (network devices) and a managing apparatus connected to a network, for example. In the system, the Multi-Function Apparatus transmits an electronic mail describing its own operating conditions to the managing apparatus. The managing apparatus manages the Multi-Function Apparatuses by collecting operating conditions of the Multi-Function Apparatuses by means of the electronic mails. For example, the operating conditions are printing conditions such as the size of a print sheet if the device is a printer.

BRIEF SUMMARY OF THE INVENTION

It is necessary for a user to configure many operating conditions before the user uses a device.

When the user replaces a failed network device with a new network device, it is also necessary for the user to set operating conditions of the failed network device to the new network device. Technologies disclosed in Japanese Patent Application Publication No. 2002-236576 enable management of the Multi-Function Apparatuses (network devices) based on operating conditions being set to the Multi-Function Apparatuses. However, with this system, when an old Multi-Function Apparatus is to be replaced by a new Multi-Function Apparatus, it is not possible to reduce a load on the user in the operation to set again the operating conditions of the old Multi-Function Apparatus to the new Multi-Function Apparatus.

There is a need for a technology to reduce the load on the user in the operation for reconfiguring the operating conditions of the new network device with the operating conditions of the old network device.

A network system disclosed herein includes network devices and a device managing apparatus that manages the network devices through a network.

The device managing apparatus includes a backup module and a managing module. The backup module receives configuration data describing operating conditions of the network device from the network device through the network. The backup module creates a configuration identifier in response to reception of the configuration data. The backup module associates the created configuration identifier with the received configuration data, and stores the received configuration data along with a configuration identifier. The managing module receives the configuration identifier which is entered by a user through one of the network devices. The entered configuration identifier is transmitted through the network. The managing module extracts configuration data, from the stored configuration data, associated with the received entered configuration identifier. Further, the managing module transmits the extracted configuration data to the network device which has transmitted the entered configuration identifier. The backup module and the managing module may be realized by a program on computers connected to the network. When the technology disclosed herein is realized as a computer program, the "backup module" may be referred to as "backup process". Moreover, the "managing module" may be referred to as "managing process". The computer installed the program performs as the "device managing apparatus".

The network device includes a transmitter, input module, and setting module. The transmitter transmits the configuration data describing own operating conditions to the device managing apparatus. The input module is a device such as a keyboard, a console panel and a mouse used by the user to enter the configuration identifier. The setting module transmits the entered configuration identifier to the device managing apparatus. Moreover, the setting module receives the extracted configuration data transmitted from the device managing apparatus. Further, the setting module sets the operating conditions described in the extracted configuration data as own operating conditions.

The "network device" may be simply referred to as "device" hereinafter. Moreover, the "device managing apparatus" may be referred to as "managing apparatus".

When the managing apparatus receives configuration data describing operating conditions of a device, the managing apparatus creates new configuration identifier and attaches the created configuration identifier to the received configuration data. Moreover, the managing apparatus stores the configuration data with the created configuration identifier. In this manner, the managing apparatus collects and stores configuration data of the individual devices connected to the network.

On the other hand, the device has the input module for the user to enter the configuration identifier. The user can enter the configuration identifier that is associated with the configuration data that the user desires to set. The device transmits entered configuration identifier to the managing device. In response to the transmission of the entered configuration identifier, the managing apparatus transmits the configuration data associated with the entered configuration identifier. The device receives the configuration data associated with the entered configuration identifier. The device sets the operating conditions described in the received configuration data to itself. For example, the configuration data along with the configuration identifier of an old device connected to the network are stored in the managing apparatus. If the old device connected to the network is replaced by a new device, it is only necessary for the user to enter the configuration identifier associated with the configuration data of the old device. As a result, the managing apparatus transmits the configuration data describing the operating conditions set to the old device to the new device, and the operating conditions of the old device are set to the new device.

The network system described above can be expressed as "a method for managing network devices from a managing apparatus through a network". The method can be realized as a computer program or a computer implemented method. The computer program (or the method) includes instructions for the managing apparatus and the devices to perform following steps:

(a) a step of transmitting configuration data describing operating conditions of the network device from the network device to the device managing apparatus through the network;

(b) a step of receiving the configuration data, the step is executed by the managing apparatus;

(c) a step of storing the received configuration data along with a configuration identifier which is associated with the received configuration data, the step is executed by the managing apparatus;

(d) a step of acquiring the configuration identifier which is entered by a user, the step is executed by one of the network devices;

(e) a step of transmitting the entered configuration identifier to the device managing apparatus, the step is executed by the network device which has acquired the entered configuration identifier;

(f) a step of receiving the entered configuration identifier that is transmitted from the network device which has acquired the entered configuration identifier, the step is executed by the device managing apparatus;

(g) a step of extracting configuration data, from the stored configuration data, associated with the received entered configuration identifier, the step is executed by the device managing apparatus;

(h) a step of transmitting the extracted configuration data from the device managing apparatus to the network device which has transmitted the entered configuration identifier;

(i) a step of receiving the extracted configuration data transmitted from the device managing apparatus, the step is executed by the network device which has transmitted the entered configuration identifier; and j) a step of setting the operating conditions described in the extracted configuration data as own operating conditions, the step is executed by the network device which has transmitted the entered configuration identifier.

According to the teachings disclosed herein, it is possible to reduce the burden on the user in setting again the operating conditions when a device connected to the network is replaced by a new device.

DETAILED DESCRIPTION OF THE INVENTION

First Embodiment

Figure 1:
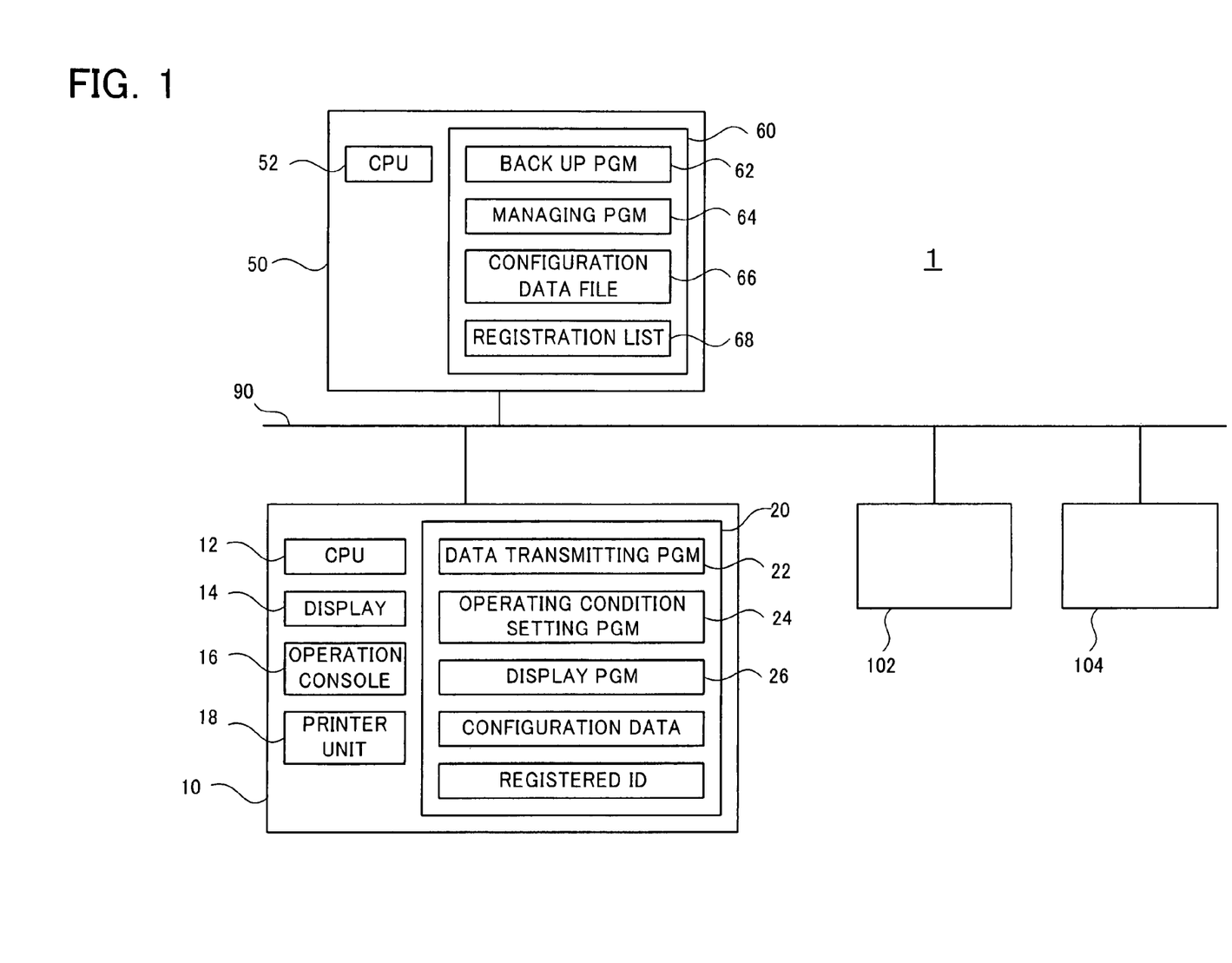
FIG. 1 shows a block diagram of a network system according to a first embodiment.

A description will now be given of an embodiment according to the present invention with reference to drawings. FIG. 1 shows a block diagram of a network system 1 according to a first embodiment.

The network system 1 includes a first printer 10 and a server 50 (device managing apparatus) connected to a network 90. In addition to the first printer 10, a second printer 102 and a third printer 104 are connected to the network 90. The printers 10, 102, and 104 are kinds of the network devices.

The server 50 and the respective printers can communicate with each other through the network 90 using a protocol based on the TCP/IP.

The respective printers can be changed in various ways in the operating conditions such as a print paper size, and a print mode (color print mode or monochrome print mode). Data describing the operating conditions are referred to as configuration data.

The server 50 and the first printer 10 cooperate with each other to manage the configuration data. If a new printer provided with the same function for managing the configuration data is connected to the network 90, this new printer is also incorporated into the network system 1. The second printer 102 and the third printer 104 are also provided with the function for managing the configuration data as the first printer 10.

A description will now be given of an overview of an operation of the network system 1 with reference to FIG. 2.

Figure 2:
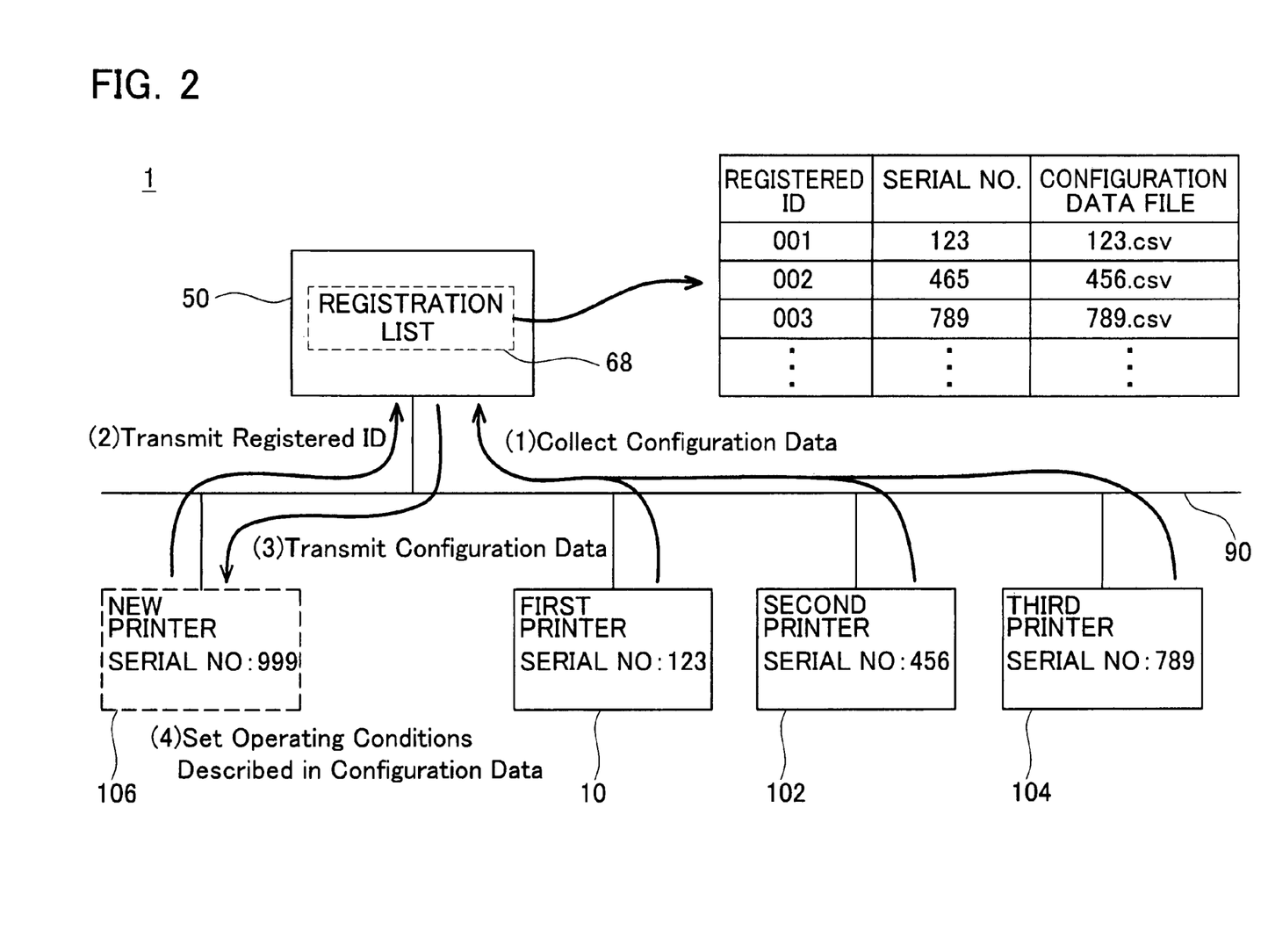
FIG. 2 describes an overview of an operation of the network system.

The server 50 collects and stores the configuration data from the respective printers ((1) in FIG. 2). It should be noted that a serial no. is assigned to the respective printers. The serial no. is a unique device identifier assigned to the respective printers. The server collects the serial no. along with the configuration data from the respective printers.

The server 50 creates a registered ID (configuration identifier) each time the configuration data is collected. The server 50 links the created registered ID to collected configuration data uniquely. The server 50 stores the respective collected configuration data associated with the created registered ID. The correspondences between the respective configuration data and the respective registered ID are registered and stored in the registration list 68. In FIG. 2, the server 50 stores the configuration data of the first printer 10 as a file "123.csv", and assigns a registered ID "001" to the configuration data of the first printer 10. Similarly, the server 50 stores the configuration data of the second printer 102 as a file "456.csv", and assigns a registered ID "002" to the configuration data of the second printer 102. Similarly, the server 50 stores the configuration data of the third printer 104 as a file "789.csv", and assigns a registered ID "003" to the configuration data of the third printer 104. It should be noted that the extension "csv" of the configuration data file stands for "Comma Separated Values", and means a text file including respective data separated by a comma. In other words, the configuration data file describes the multiple operating conditions of the respective printers separated by a comma in text format.

It is assumed that the third printer 104 fails, and the user connects a new printer 106 in place of the third printer 104 to the network. If the user wants to set the same operating conditions as the operating conditions of the third printer 104 to the new printer 106, the user operates an operation console (input module) of the new printer 106 to enter the registered ID "003" assigned to the configuration data of the third printer 104. The registered ID that the user inputs to the printer may be referred to as the "entered registration ID" or "entered configuration identifier".

The new printer 106 transmits the entered registered ID to the server 50 ((2) in FIG. 2). When the server 50 receives the entered registered ID, the server 50 transmits the configuration data file "789.csv" (namely, the configuration data describing the operating conditions of the third printer 104) associated with the entered registered ID to the new printer 106 ((3) in FIG. 2). The new printer 106 sets the operating conditions described in the received configuration data as own operating conditions ((4) in FIG. 2). In this way, the operating conditions of the new printer 106 are set to the same operating conditions as those of the third printer 104. It is only necessary for the user to enter the registered ID to the new printer 106.

This network system 1 can reduce a burden on the user in the operation to set the operating conditions same as the old printer.

Back to FIG. 1, a description will now be given of configurations of the first printer 10 and the server 50. Since configurations of the second printer 102 and the third printer 104 are the same as that of the first printer 10, a description thereof is omitted. The first printer 10 may be simply referred to as printer 10 hereinafter.

The printer 10 includes a CPU 12, a display 14, the operation console 16, a printer unit 18, and a storage 20.

The storage 20 stores a data transmitting program 22, an operating condition setting program 24, and a display program 26. The CPU 12 executes various processes based on these programs stored in the storage 20. It should be noted that "PGM" in FIG. 1 stands for "program".

The storage 20 also stores the configuration data describing the operating conditions for operating the printer unit 18. The configuration data includes an IP address assigned to the printer 10. The "IP address" in TCP/IP protocol is a typical example of the network node identifier. The configuration data also includes a unique Media Access Control (MAC) address assigned to a communication unit (not shown) of the printer 10.

The storage 20 also stores the registered ID transmitted from the server 50.

The server 50 includes a CPU 52 and a storage 60.

The storage 60 stores a backup program 62, a managing program 64, configuration data files 66, and a registration list 68. The CPU 12 executes various processes based on these programs stored in the storage 60.

The configuration data files 66 are respectively formed from the each configuration data collected from the printers (the first printer 10, the second printer 102, and the third printer 104) as described before.

The registration list 68 is a list describing the correspondences between the respective configuration data files and the registered ID as described before. When the server 50 receives the configuration data from one of the printers, the server creates a new registered ID to be associated with the received configuration data.

A description will now be given of an overview of the processes executed by the respective programs stored in the printer 10 and the server 50.

Described in the backup program 62 stored in the server 50 is a process (process indicated by (1) in FIG. 2) which collects the configuration data from the printers. Described in the managing program 64 stored in the server 50 is a process (process indicated by (3) in FIG. 2) which transmits the predetermined configuration data to a printer in response to a request from the printer.

Described in the data transmitting program 22 stored in the printer 10 is a process which transmits the own configuration data to the server 50 in response to a request from the server 50. Described in the operating condition setting program 24 stored in the printer 10 is a process which transmits the registered ID entered by the user (entered registered ID) to the server 50, receives the configuration data from the server 50, and sets the operating conditions described in the received configuration data as own operating conditions (processes indicated by (2) and (4) in FIG. 2).

A specific description will now be given of the respective processes.

First, a description will now be given of the process (referred to as backup process) in which the server 50 collects and stores the configuration data from the respective printers. The collection of the configuration data is achieved by the cooperation of the backup process of the server 50 and a configuration data transmit process of the printer 10, and the description will thus be given of the backup process of the server 50 and the configuration data transmit process of the printer 10 at a time.

Figure 3:
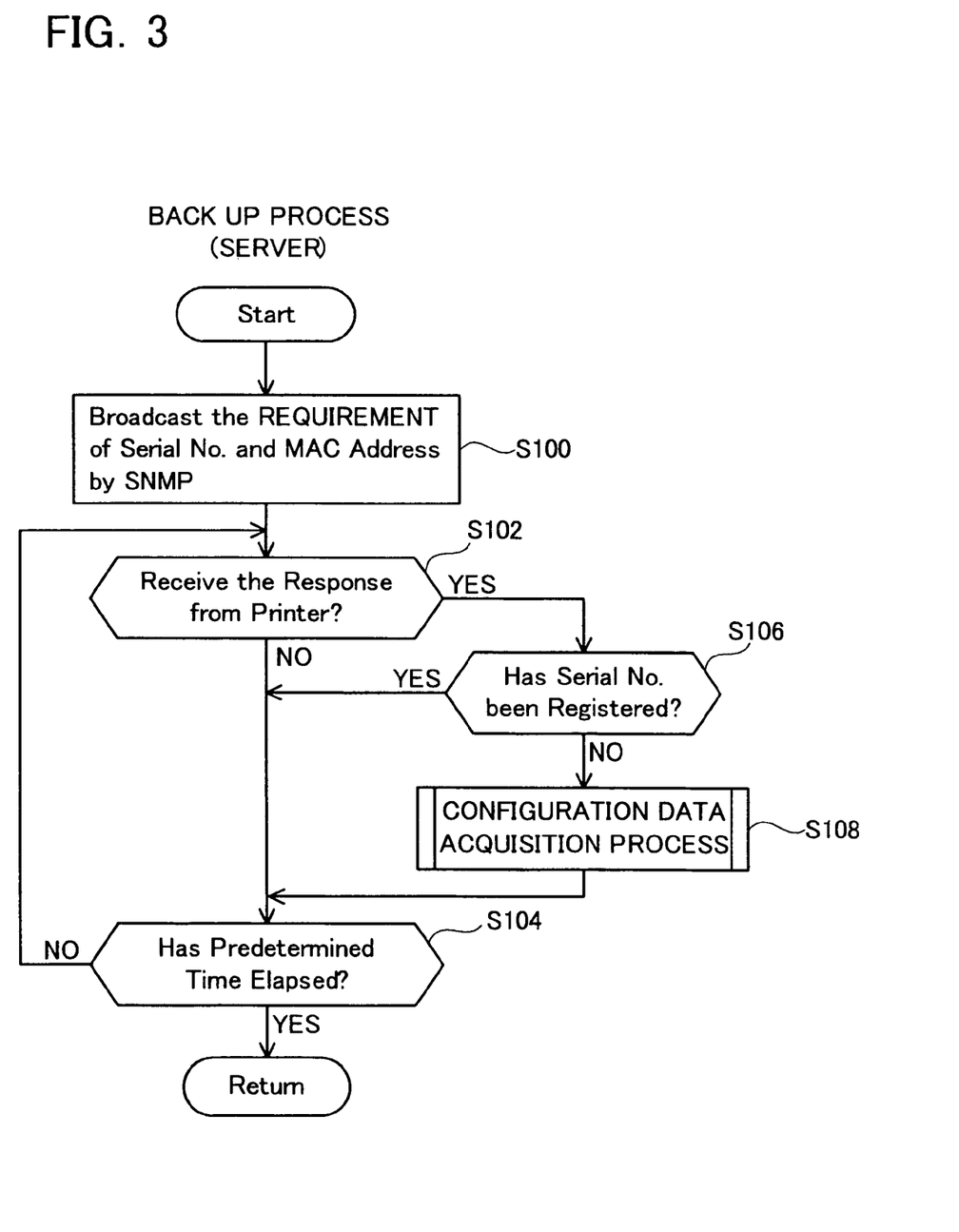
FIG. 3 shows a flowchart of a backup process executed by a server.

FIG. 3 shows a flowchart of the backup process executed by the server 50.

The server 50 may not have detected all the printers connected to the network. For example, the server 50 may not detect a printer newly connected to the network. Thus, the server 50 first broadcasts a command according to the SNMP, which requests printers to transmit a serial no. and a MAC address (step S100). Since this command is broadcasted, this command is received by all the devices connected to the network. In other words, at the moment when the step S100 is executed, the server 50 does not have to identify the printers connected to the network.

After the server 50 has broadcasted the command, the server 50 waits for a predetermined period whether there is a response from a printer ("NO" in a step S102, "NO" in a step S104). If there is no response from printers in the predetermined period ("YES" in the step S104), it is determined that printers are not connected to the network, and the process is thus finished.

If there is a response to the command requesting for the transmission of a serial no. and a MAC address from a printer ("YES" in the step S102), the server 50 determines whether a serial no. contained in the response has already been registered to the registration list 68 (step S106). If the serial no. has already been registered to the registration list 68 ("YES" in the step S106), since the configuration data of the printer to which this serial no. is assigned has already been stored, the response from this printer is neglected.

If the serial no. is not registered to the registration list 68 ("NO" in the step S106), it is determined that the configuration data of the printer to which the serial no. is assigned has not been registered to the registration list 68. In this case, the server 50 executes the process for acquiring the configuration data from the printer of which the serial no. is not registered to the registration list 68 (step S108). A description will later be given of a configuration data acquisition process in the step S108.

After the execution of the configuration data acquisition process (step S108), the server 50 waits for a response from other printers till the predetermined period elapses ("NO" in the step S104).

It should be noted that the server 50 periodically executes the process in FIG. 3 (backup process).

Figure 4:
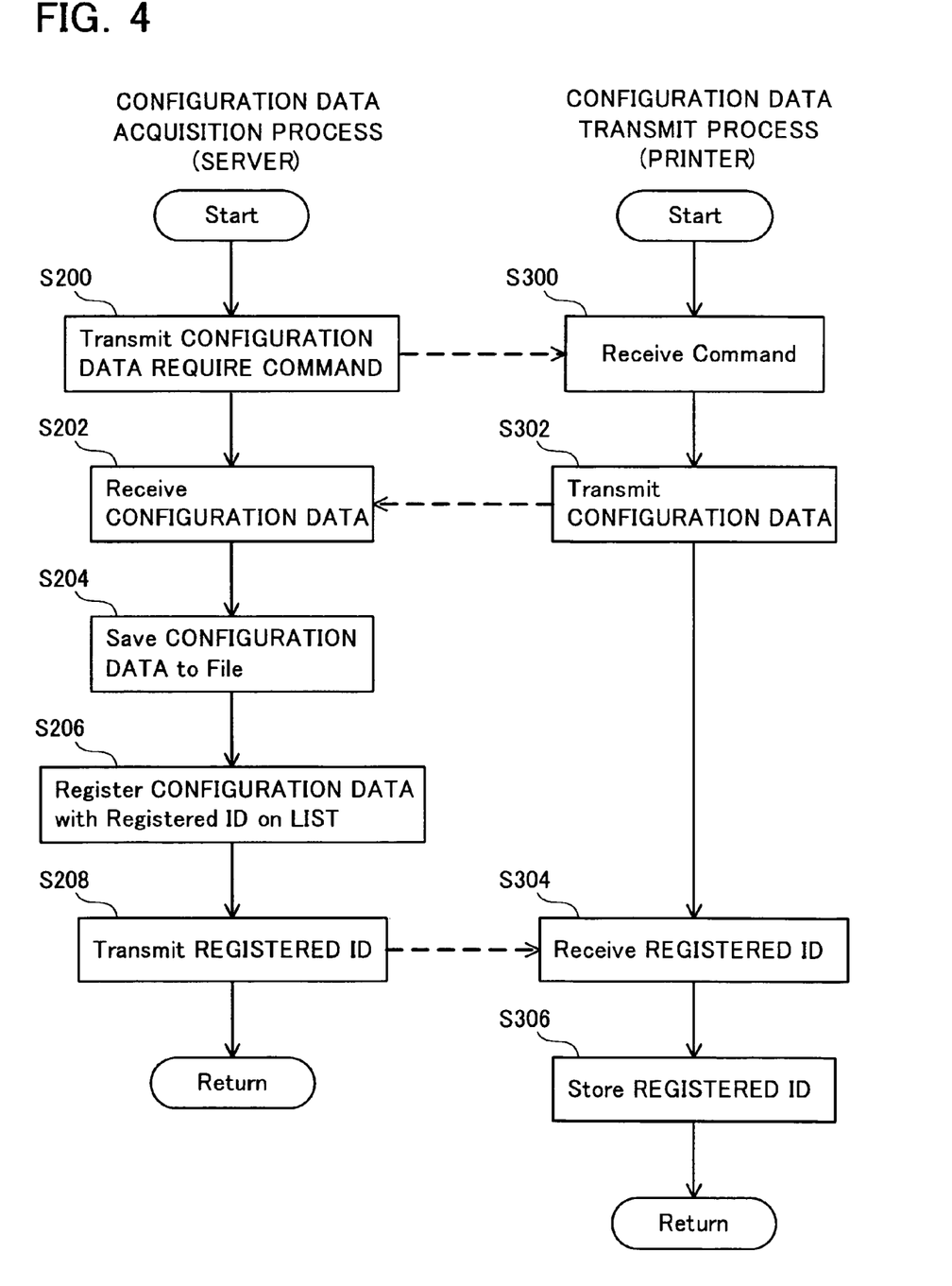
FIG. 4 shows flowcharts of a configuration data acquisition process executed by the server and a configuration data transmit process executed by a device (printer)

A description will now be given of the configuration data acquisition process executed by the server 50 (process in the step S108 in FIG. 3). FIG. 4 shows a flowchart of the configuration data acquisition process executed by the server 50. FIG. 4 also shows a flowchart of a process (configuration data transmit process) executed by the printer 10 in response to the configuration data acquisition process of the server 50. Broken lines in the flowcharts represent transmission and reception of data (such as commands and configuration data) between the server 50 and the printer 10.

First, the server 50 transmits a configuration data require command, which requests the printer 10 to transmit the configuration data, to the printer 10 (step S200).

The printer 10 receives the configuration data require command from the server 50 (step S300). Then the printer 10 transmits the configuration data describing the own configuration conditions to the server 50 in response to reception of the command (step S302).

The server 50 receives the configuration data from the printer 10 (step S202), converts the received configuration data into a csv file, and stores the csv file (step S204). The server 50 creates a new registered ID for the stored configuration data (configuration data file), and registers the name of the configuration data file and the created registered ID to the registration list 68 (step S206). In other words, the server 50 creates the new registered ID and associates the created registered ID with the configuration data received from the printer 10. It should be noted that the server 50 receives the serial no. of the printer 10 along with the configuration data, and registers the serial no. along with the name of the configuration data file to the registration list 68. In other words, the serial no. is also associated with the created registered ID. A specific example of the registration list 68 is shown in FIG. 2.

The server 50 transmits the created registered ID to the printer 10, and finishes the backup process (step S208).

In this way, the registration list 68 and the configuration data file 66 are stored in the storage 60 of the server 50.

When the printer 10 receives the registered ID from the server 50 (step S304), the printer 10 stores the received registered ID (step S306), and finishes the configuration data transmit process.

A description will now be given of the processes of the server 50 and the printer 10 when the user wants to set the same operating conditions as those of another printer to the printer 10 (when an old printer is replaced by a new printer, for example). In the description, the process executed by the printer 10 is referred to as operating condition setting process, and the process executed by the server 50 is referred to as configuration data managing process. The operating condition setting process executed by the printer 10 and the configuration data managing process executed by the server 50 proceed in cooperation with each other, and the description will thus be given of them at a time.

Figure 5:
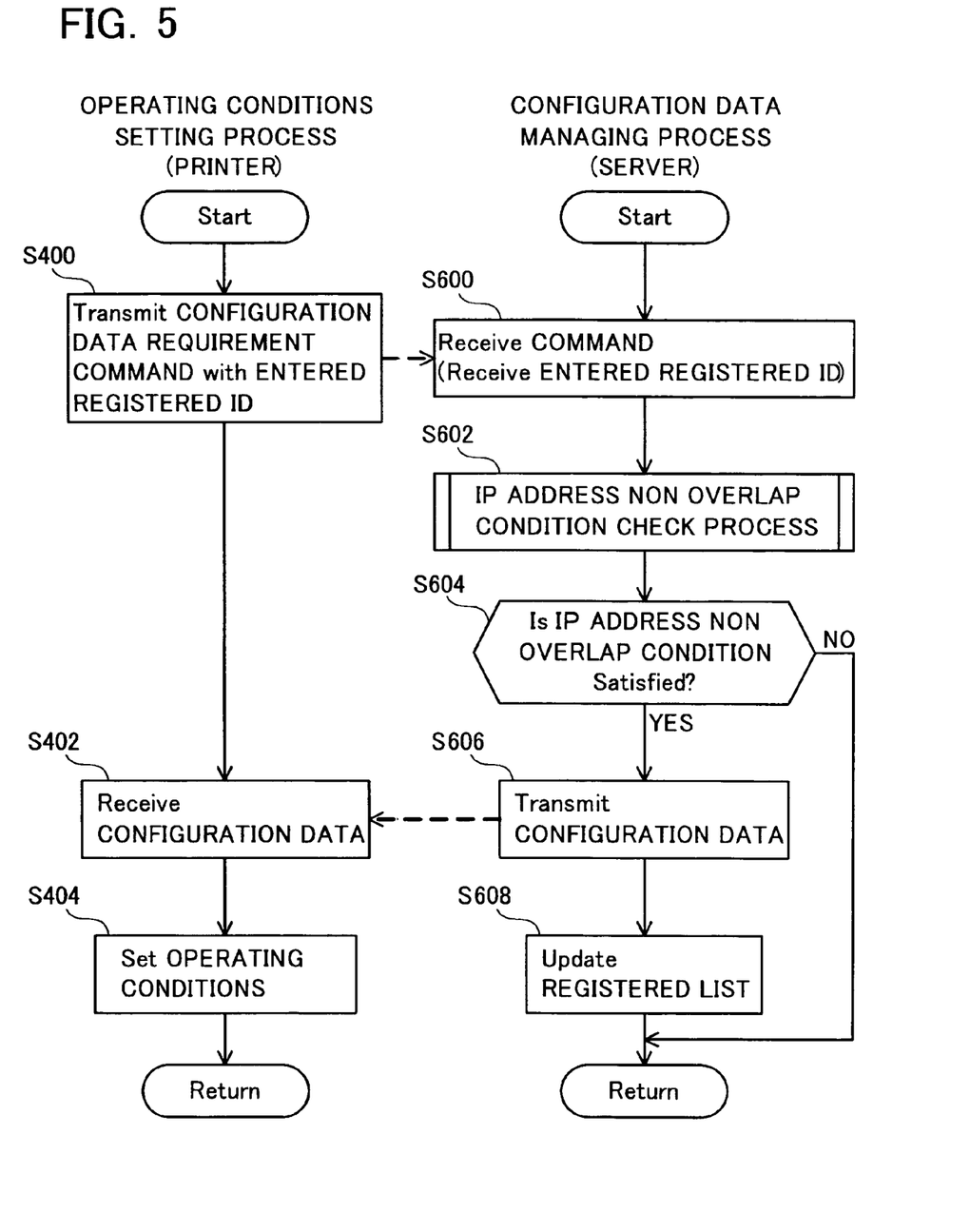
FIG. 5 shows flowcharts of an operating condition setting process executed by the device (printer) and a configuration data managing process executed by the server.

FIG. 5 shows a flowchart of the operating condition setting process executed by the printer 10 and the configuration data managing process executed by the server 50.

Before the processes of the flowchart in FIG. 5, the user operates the operation console 16 of the printer 10 to enter a registered ID associated with configuration data describing desired operating conditions. When the registered ID is entered, the operating condition setting process executed by the printer 10 starts. The registered ID which inputted to the printer 10 by the user may be referred to as the "entered registered ID".

The printer 10 transmits the configuration data require command with the entered registered ID (step S400). It should be noted that the printer 10 transmits the configuration data require command with the own serial no. and MAC address as well as the entered registered ID. The printer 10 does not know the IP address of the server 50, and thus the printer 10 broadcasts the configuration data require command. In other words, the process in the step S400 is a process of the printer 10 for transmitting the entered registered ID to the server 50.

The server 50 is programmed to recognize the configuration data require command, and can thus receives the configuration data require command transmitted by the printer 10 (step S600). It should be noted that the server 50 monitors commands transmitted through the network, and when the server 50 receives the configuration data require command (step S600), the configuration data managing process starts.

The server 50 refers to the registration list 68, and extracts (identifies) configuration data corresponding to the entered registered ID contained in the received configuration data require command. The extracted configuration data is transmitted to the printer 10 which has transmitted the configuration data require command (step S606). In other words, the server 50 transmits the extracted configuration data to the printer 10 which has transmitted the entered registered ID. Before the transmission of the configuration data, the server 50 determines whether the IP address non overlap condition (node identifier non overlap condition) is satisfied (step S602). If the IP address non overlap condition is satisfied ("YES" in a step S604), the server 50 transmits the identified configuration data (step S606).

A description will now be given of the IP address non overlap condition.

The configuration data contains data of the IP address. On this network system 1, it is possible to set the operating conditions including an IP address to each printer. A redundant IP address cannot be set on the network. Then, before the transmission of the configuration data, the server 50 determines that the IP address contained in the configuration data to be transmitted does not overlap an IP address assigned to another device on the network. On this occasion, it is acceptable that the IP address of the printer 10, which has transmitted the configuration data require command, coincides with the IP address contained in the configuration data to be transmitted. In other words, the IP address non overlap condition means that the IP address (network node identifier) contained in the extracted configuration data is not assigned to a device other than the printer which has transmitted the entered registered ID.

The IP address non overlap condition means that the IP address contained in configuration data to be transmitted is not assigned to a device other than the printer 10 that has transmitted the configuration data require command with the entered registered ID.

Figure 6:
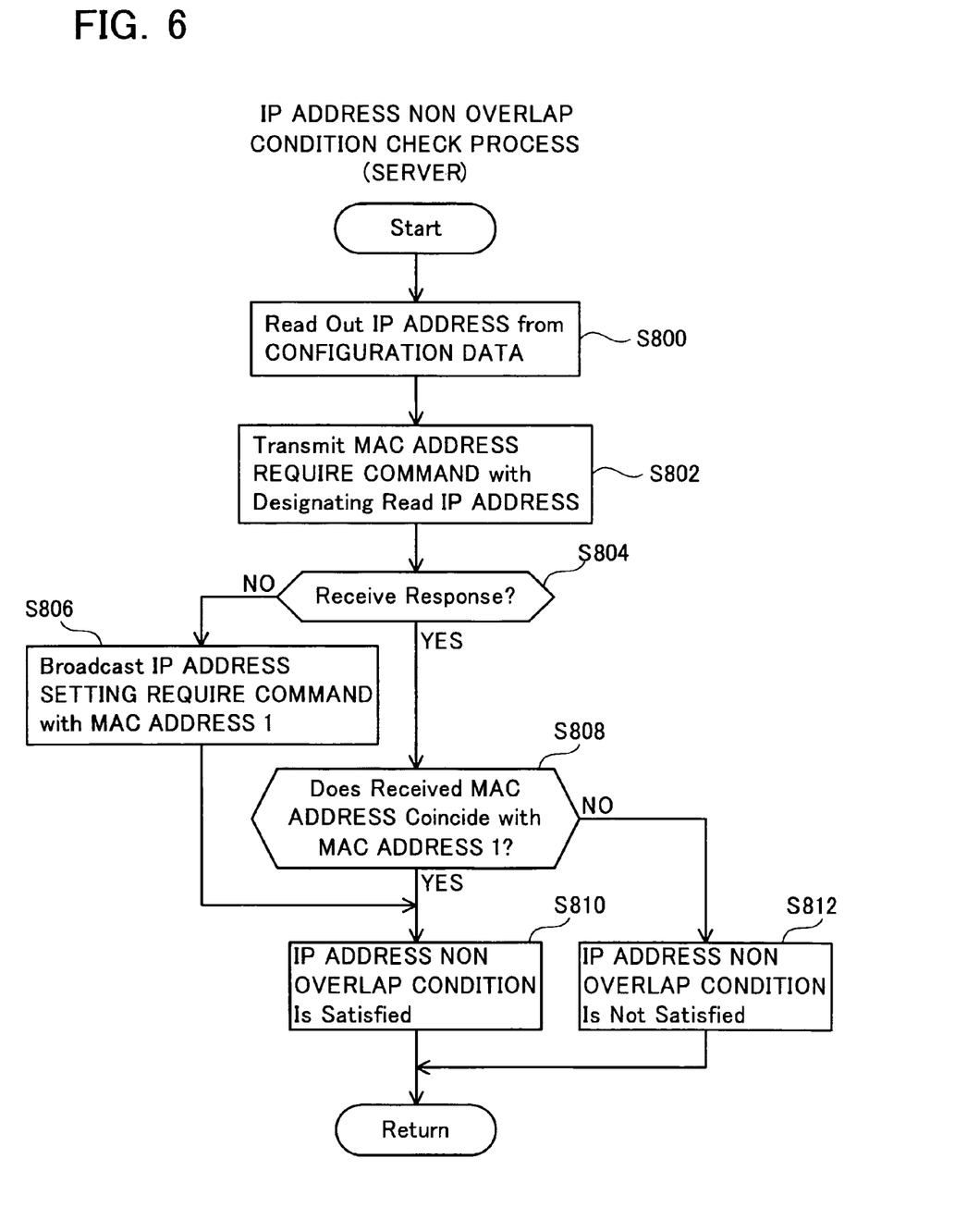
FIG. 6 shows a flowchart of an IP address non overlap condition check process executed by the server.

A description will later be given of the process for determining whether the IP address non overlap condition is satisfied or not (step S602) with reference to FIG. 6.

If the IP address non overlap condition is satisfied ("YES" in a step S604), the server 50 transmits the configuration data associated with the entered registered ID received with the configuration data require command to the printer 10 that has transmitted the configuration data require command with the entered registered ID (step S606).

If the IP address non overlap condition is not satisfied ("NO" in step S604), it is not possible to transmit the configuration data in response to reception of the configuration data require command, and the process is thus finished.

If the printer 10 receives the configuration data (step S402), the printer 10 sets the operating conditions including the IP address described in the received configuration data to the own operating conditions (step S404).

In this way, the user can set the desired operating conditions to the printer 10 by simply entering the registered ID, to the printer 10, associated with the configuration data describing the desired operating conditions.

A description will now be given of the IP address non overlap condition check process (the step S602 in FIG. 5). FIG. 6 shows a flowchart of the IP address non overlap condition check process.

The server 50 has received the entered registered ID and the MAC address transmitted by the printer 10 along with the configuration data require command in the step S600 in the configuration data managing process (see FIG. 5). The MAC address received in the step S600 is referred to as "MAC address 1". The MAC address 1 is a MAC address of the printer 10.

The server 50 refers to the registration list 68 and extracts (identifies) the configuration data associated with the entered registered ID transmitted by the printer 10. The server 50 reads out the IP address contained in the extracted configuration data (step S800). Then, the server 50 transmits a MAC address require command while designating the read IP address as the destination of the transmission (step S802).

If there is no response to the transmitted MAC address require command ("NO" in a step S804), it is determined that there is no device to which the read IP address is assigned on the network. In other words, in this case, it is determined that the IP address non overlap condition is satisfied (step S810).

In this case, the IP address of the printer 10 which has transmitted the configuration data require command is also different from the read IP address. In this case, the server 50 broadcasts the IP address setting require command which requests the printer 10 to setting the read IP address along with the MAC address 1 (step S806).

The printer 10 is programmed to recognize the IP address setting require command. Since the MAC address accompanying the broadcasted IP address setting require command is the own MAC address 1 of the printer 10, the printer 10 recognizes that the IP address setting require command is designated to itself. The printer 10 sets the IP address read out by the server 50 to its own IP address based on the IP address setting require command.

If there is a response to the transmitted MAC address require command ("YES" in the step S804), it is determined whether the MAC address received along with this response coincide with the MAC address 1 (step S808). If the received MAC address coincides with the MAC address 1 ("YES" in the step S808), it is determined that the read IP address is assigned to the printer 10 itself which has transmitted the configuration data require command. In other words, in this case, it is determined that the IP address non overlap condition is satisfied (step S810).

On the other hand, if the MAC address received along with the response to the MAC address require command does not coincide with the MAC address 1 ("NO" in the step S808), the read IP address is assigned to a device other than the printer 10. In other words, in this case, it is determined that the IP address non overlap condition is not satisfied (step S812).

In this way, the server 50 can determine whether the IP address non overlap condition is satisfied or not.

With the network system 1 according to the above-described embodiment, the user can set desired operating conditions by simply entering a registered ID, to the desired printer (network device), that is associated with configuration data describing desired operating conditions.

The operating conditions may contain the IP address (the node identifier), and if it is the case, the network system 1 determines that the IP address does not overlap, and, then, sets the operating conditions containing the IP address.

A description will now be given of other functions of the network system 1.

The server 50 periodically updates the stored configuration data. The server 50 executes a configuration data update process in every predetermined period.

Figure 7:
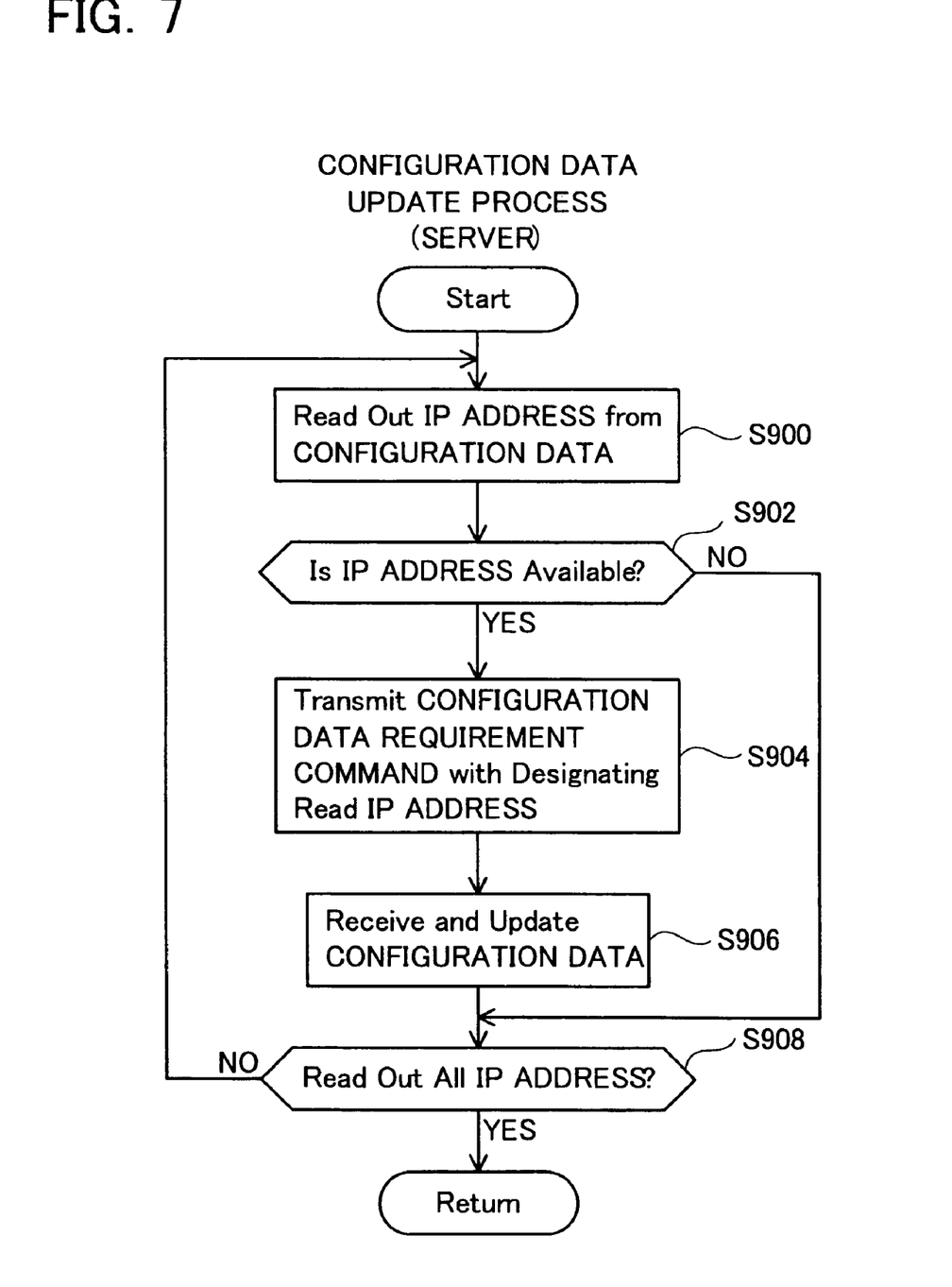
FIG. 7 shows a flowchart of a configuration data update process executed by the server.

FIG. 7 shows a flowchart of the configuration data update process executed by the server 50.

In the configuration data update process, first, the server 50 reads out an IP address from one of the stored configuration data (step S900). Then, the server 50 determines whether the read IP address is communicable (step S902). In other words, the server 50 determines whether a printer to which the read IP address is assigned is available on the network. Whether the IP address is communicable or not may be determined in the following way. It is determined that the IP address is communicable, if the IP address non overlap condition check process shown in FIG. 6 is executed and the determination of "YES" is made in the step S808.

If the IP address is communicable ("YES" in the step S902), the configuration data require command is transmitted while the read IP address is designated as a destination of the transmission (step S904). The server 50 receives the configuration data from the printer responding to this command. The configuration data file is updated by the received configuration data.

The server 50 repeats the above process until all the IP addresses are read out for all the configuration data files registered to the registration list 68 (step S908).

With this configuration data update process, the server 50 can always store the latest configuration data. The configuration data update process is described in the managing program 64 of the server 50.

The printer 10 can display the newly created registered ID received from the server 50 on the display 14. The created registered ID shown on the display enables the user to easily know the registered ID assigned to the printer. This process is described in the display program 26 stored in the printer. Moreover, there may be provided a configuration which prints the registered ID by the printer 10 to notify the user thereof.

The preferred technical features of the embodiment will be listed below.

A network node identifier is often set to a device (printer) connected to a network in order to identify the device on the network. The network node identifier corresponds to an IP address in the case of the TCP/IP. If an old device is replaced by a new device, it is preferred that the network node identifier is set to the new device along with operating conditions. Therefore, the configuration data of the device may include the network node identifier, which identifies the device on the network. In other words, the configuration data may include the network node identifier as one of the operating conditions. If the operating conditions including the network identifier of the old device can be easily set to the new device, it is possible to further reduce the burden on a user in the operation caused by the device replacement. For example, the network node identifier may be set as device information to a terminal device connected to the device through the network in order to remotely operate the device. If the operating conditions including the network node identifier can be copied from an old device to a new device, it is not necessary for the user to change the device information set to the terminal device.

The network node identifier is uniquely assigned for each device on the network. Therefore, if the configuration data includes the network node identifier, the managing module of the managing apparatus (server) preferably has the following technical features.

The managing module of the device managing apparatus (server) reads out the network identifier contained in extracted configuration data. The managing module then determines whether or not a node identifier non overlap condition is satisfied. The node identifier non overlap condition means that the read network node identifier is not assigned to a device other than the device which has transmitted the entered configuration identifier. If the node identifier non overlap condition is satisfied, the managing module may transmit the extracted configuration data.

With the above technical feature, it is possible to set the operating conditions including the network node identifier to the new device without the network node identifier being overlapped.

Whether the node identifier non overlap condition is satisfied or not may be determined in the following manner.

The managing module receives, along with the entered configuration identifier, a device identifier that is unique to the device which has transmitted the entered configuration identifier. The managing module tries to transmit, to a device to which the read network node identifier is assigned, a require command that requests the device to transmit the own device identifier. The managing module determines that the node identifier non overlap condition is satisfied if the managing module does not receive a response to the require command, or if a device identifier transmitted from one of the devices responding to the require command coincides with the device identifier received along with the entered configuration identifier.

The device identifier unique to a device may be a Media Access Control (MAC) address in the case of the TCP/IP.

The managing module of the managing apparatus (server) preferably transmits the configuration identifier associated with the received configuration data to the devices which have transmitted the configuration data. The device receives the configuration identifier transmitted from the managing apparatus, and preferably includes display module which displays the received configuration identifier. The user can easily confirm the configuration identifier associated with the device by the managing apparatus.

The CPU 52 of the server 50 can be referred to as the "backup module" while executing the backup program 62 (or the backup process). The CPU 52 of the server 50 can be referred to as the "managing module" while executing the managing program 64 (or the configuration data managing process and/or the IP address non overlap condition check process and/or the configuration data update process). The CPU 12 of the printer 10 (the network device) can be referred to as the "data transmitting module" or "transmitter" while executing the data transmitting program 22 (or the configuration data transmitting process). The CPU 12 of the printer 10 (the network device) can be referred to as the "setting module" while executing the operating condition setting program 24 (or operating conditions setting process). The CPU 12 of the printer 10 (the network device) can be referred to as the "displaying module" while executing the display program 26.

Although the specific example of the present invention has been detailed above, this is simply an example, and thus does not limit the scope of claims. Technologies described in claims include various changes and modifications of the specific examples described above.

The technical features described herein and with reference to the accompanying drawings exhibit technical usefulness either alone or in combination, and are not limited to those described as filed. Moreover, the technologies exemplified herein and in the accompanying drawings can attain multiple objects at a time, and attaining one of those objects itself has a technological usefulness.

What is claimed is:

1. A network system comprising:
network devices; and
a server including
a first processing unit, and
first storage for storing instructions that, when executed by the first processing unit, cause the server to provide a device managing apparatus that manages the network devices through a network, the device managing apparatus including:
a backup module that receives, from each of the network devices, configuration data describing operating conditions of the network device through the network, and stores the received plurality of configuration data along with a configuration identifier which is associated with each of the received plurality of configuration data; and
a managing module that receives the configuration identifier which is entered by a user through one of the network devices, extracts configuration data, from the stored plurality of configuration data, associated with the received entered configuration identifier, and transmits the extracted configuration data to the one of the network devices which has transmitted the entered configuration identifier;
each of the network devices including:
an operation unit configured to be used by the user to enter the configuration identifier,
a second processing unit, and
second storage for storing instructions that, when executed, by the second processing unit, cause the network device to provide
a transmitter that transmits the configuration data describing own operating conditions to the device managing apparatus; and
a setting module that transmits the entered configuration identifier to the device managing apparatus, receives the extracted configuration data transmitted from the device managing apparatus, and sets the operating conditions described in the extracted configuration data as own operating condition;
wherein:
the configuration data includes a network node identifier that identifies each of the network devices on the network; and
the managing module of the device managing apparatus:
reads out the network node identifier from the extracted configuration data;
determines whether or not a node identifier non overlap condition is satisfied, wherein the node identifier non overlap condition indicates that the read network node identifier is not assigned to a network device other than the one of the network devices which has transmitted the entered configuration identifier; and
transmits the extracted configuration data if the node identifier non overlap condition is satisfied.

2. The network system as in claim 1, wherein:
the managing module
- receives, along with the entered configuration identifier, a device identifier that is unique to the network device which has transmitted the entered configuration identifier;
- transmits, to the network device to which the read network node identifier is assigned, a require command that requests the network device to transmit the own device identifier; and
- determines that the node identifier non overlap condition is satisfied if the managing module does not receive a response to the require command, or if a device identifier transmitted from a network device responding to the require command coincides with the device identifier received along with the entered configuration identifier.

3. The network system as in claim 1, wherein:
the managing module transmits the configuration identifier associated with the received configuration data to the one of the network devices that has transmitted the configuration data; and
each of the network devices further comprise a display module that receives the configuration identifier transmitted from the device managing apparatus and displays the received configuration identifier.

4. A method for managing network devices from a managing apparatus through a network, the method comprising:
- a step of transmitting, from each of the network devices, configuration data describing operating conditions of the network device to the device managing apparatus through the network;
- a step of receiving the configuration data, the step is executed by the managing apparatus;
- a step of storing the received plurality of configuration data along with a configuration identifier which is associated with each of the received plurality of configuration data, the step is executed by the managing apparatus;
- a step of acquiring the configuration identifier which is entered by a user, the step is executed by one of the network devices;
- a step of transmitting the entered configuration identifier to the device managing apparatus, the step is executed by the one of the network devices;
- a step of receiving the entered configuration identifier that is transmitted from the one of the network devices, the step is executed by the device managing apparatus;
- a step of extracting configuration data, from the stored plurality of configuration data, associated with the received entered configuration identifier, the step is executed by the device managing apparatus;
- a step of transmitting the extracted configuration data from the device managing apparatus to the one of the network devices;
- a step of receiving the extracted configuration data transmitted from the device managing apparatus, the step is executed by the one of the network devices; and
- a step of setting the operating conditions described in the extracted configuration data as own operating conditions, the step is executed by the one of the network devices wherein the configuration data includes a network node identifier that identifies each of the network devices on the network,
the method further comprising:
- a step of reading out the network node identifier from the extracted configuration data, the step is executed by the device managing apparatus;
- a step of determining whether or not a node identifier non overlap condition is satisfied wherein the node identifier non overlap condition indicates that the read network node identifier is not assigned to a network device other than the one of the network devices which has transmitted the entered configuration identifier, the step is executed by the device managing apparatus; and the extracted configuration data transmitting step transmits the extracted configuration data if the node identifier non overlap condition is satisfied.

5. The method as in claim 4, wherein:
the entered configuration identifier receiving step also receives a device identifier that is unique to the network device which has transmitted the entered configuration identifier; and
the determining step includes a step of trying to transmit a require command, to the network device to which the read network node identifier is assigned, that requests the network device to transmit the own device identifier; and
the determining step determines that the node identifier non overlap condition is satisfied if the managing apparatus does not receive a response to the require command, or if a device identifier transmitted from a network device responding to the require command coincides with the device identifier received along with the configuration identifier.

* * * * *